US012636638B2

(12) United States Patent (10) Patent No.: US 12,636,638 B2
Tafoya et al. (45) Date of Patent: May 26, 2026

(54) DESORPTION APPARATUS

(71) Applicant: SPIRITUS TECHNOLOGIES, PBC, White Rock, NM (US)

(72) Inventors: Jose Manuel Tafoya, Santa Fe, NM (US); Jon Rao, Santa Fe, NM (US); Matthew Nicholson Lee, Los Alamos, NM (US); Charles Frederick Cadieu, Burlingame, CA (US); Daniel Francis Opila, Bethesda, MD (US)

(73) Assignee: Spritius Technologies, PBC, White Rock, NM (US)

( * ) Notice: Subject to any disclaimer, the term of this patent is extended or adjusted under 35 U.S.C. 154(b) by 663 days.

(21) Appl. No.: 18/122,770

(22) Filed: Mar. 17, 2023

(65) Prior Publication Data
US 2024/0307852 A1 Sep. 19, 2024

(51) Int. Cl.
*B01D 53/04* (2006.01)
*B01J 20/28* (2006.01)
*B01J 20/34* (2006.01)
*F26B 3/28* (2006.01)
*F26B 23/06* (2006.01)

(52) U.S. Cl.
CPC ...... *B01J 20/3491* (2013.01); *B01D 53/0438* (2013.01); *B01D 53/0446* (2013.01); *B01J 20/28019* (2013.01); *B01J 20/3483* (2013.01); *F26B 3/283* (2013.01); *F26B 23/06* (2013.01); *B01D 2259/4009* (2013.01); *B01D 2259/40098* (2013.01)

(58) Field of Classification Search
CPC . B01D 53/04; B01J 20/28; B01J 20/34; F26B 23/06; F26B 3/28
See application file for complete search history.

(56) References Cited

U.S. PATENT DOCUMENTS 8,754,369 B2 * 6/2014 Christy .............. G01N 33/2025
250/288

FOREIGN PATENT DOCUMENTS

EP 0381002 A1 * 8/1990 .......... B01J 20/3416

* cited by examiner

*Primary Examiner* — Sharon Pregler
(74) *Attorney, Agent, or Firm* — CRGO Global; Steven M. Greenberg

(57) ABSTRACT

A gas desorption apparatus includes a central desorption chamber defining an interior portion adapted for heating, an inlet airlock coupled to chamber, a pump system coupled to each interior portion of the chamber and the inlet airlock and operable to create a pressure equivalency between the interior portions, and a channel disposed between the interior portion of the desorption chamber and an adsorbate storage chamber. The inlet airlock includes an exit port allowing passage from the interior portion of the inlet airlock into the interior portion of the central desorption chamber, an egress port allowing passage from an exterior portion of the inlet airlock into the interior portion of the inlet airlock and a toggleable door at each of the egress port and the ingress port sealing the interior portion of the inlet airlock when each said toggleable door is in a closed position.

10 Claims, 2 Drawing Sheets

DESORPTION APPARATUS

BACKGROUND OF THE INVENTION

Field of the Invention

The present invention relates to the field of gas desorption and more particular to an apparatus arranged to promote gas desorption from adsorption capture elements into a adsorbate storage chamber.

Description of the Related Art

Adsorption refers to the increase in concentration of a substance at an interface of a condensed and a liquid or gaseous layer owing to the operation of surface forces. More concretely, adsorption is the adhesion of molecules of gas, liquid, or dissolved solids to a surface. The adsorption process results in the creation of a film of an adsorbate upon a surface of an adsorbent. Adsorption differs from absorption in which one substance permeates another. As well, whereas adsorption can be characterized as a surface phenomenon, absorption involves the whole volume of the material. Like surface tension, adsorption is a consequence of surface energy.

Adsorption capitalizes upon the tendency of one or more components of a liquid or gas to collect on the surface of a solid. This tendency can be leveraged to remove solutes from a liquid or gas or to separate components that have different affinities for the solid. The process objective may be either waste treatment or the purification of valuable components of a feed stream. In an adsorption process, the solid is called the adsorbent and the solute is known as the adsorbate.

Opposite to the process of adsorption is desorption. In desorption, the atomic or molecular species forming the adsorbate leaves the surface of the adsorbent and escapes into the surrounding. Generally, the adsorbate leaves the surface of the adsorbent when the molecules of the adsorbate gain enough energy to overcome the threshold of the bounding energy binding the adsorbate to the surface of the adsorbent. Many techniques are known for promoting adsorption—particularly of a gas—but the most common techniques include some combination of heating a chamber in which the adsorbent substrate is placed in order to impart enough energy upon the adsorbate to promote the breaking of the adsorption forces. In many instances, where it is desirable to capture the adsorbate upon desorption without contaminating the adsorbate upon desorption, a vacuum can be applied to the chamber during heating so that the adsorbate once released from the adsorbent is free in the chamber from contamination.

BRIEF SUMMARY OF THE INVENTION

Embodiments of the present invention address deficiencies of the art in respect to desorbing an adsorbate from an adsorbent substrate into a storage container and provide a novel and non-obvious gas desorption apparatus. In an embodiment of the invention, a gas desorption apparatus includes a central desorption chamber defining an interior portion adapted for heating, an inlet airlock coupled to the central desorption chamber, a pump system coupled both to each of the interior portion of the desorption chamber and an interior portion of the inlet airlock and operable to create a pressure equivalency between the interior portion of the desorption chamber and the interior portion of the inlet airlock, and also to a channel disposed between the interior portion of the desorption chamber and an adsorbate storage chamber through which adsorbate desorbed during gas desorption within the interior portion of the desorption chamber travels into the adsorbate storage chamber. Notably, the inlet airlock includes an egress port allowing passage from the interior portion of the inlet airlock into the interior portion of the central desorption chamber, an ingress port allowing passage from an exterior portion of the inlet airlock into the interior portion of the inlet airlock and a toggleable door at each of the egress port and the ingress port sealing the interior portion of the inlet airlock when each said toggleable door is in a closed position.

In one aspect of the embodiment, an outlet airlock is coupled to the central desorption chamber. The outlet airlock includes an ingress port allowing passage from an interior portion of the outlet airlock from the interior portion of the central desorption chamber and an egress port allowing passage to an exterior portion of the outlet airlock from the interior portion of the outlet airlock. As well, the outlet airlock includes a vacuum line connected to the vacuum pump system. Even further, the outer airlock includes a toggleable door at each of the egress port and the ingress port sealing the interior portion of the outlet airlock when each said toggleable door is in a closed position. Finally, the outlet airlock includes a purge gas vent coupled to a room temperature and pressure non-reactive gas source.

In another aspect of the embodiment, the pump system includes a separate vacuum pump for each of the inlet airlock and the central desorption chamber. To that end, the separate vacuum pump for the central desorption chamber can be positioned inline in the channel between the interior portion of the desorption chamber and the adsorbate storage chamber.

In yet another aspect of the embodiment, a radiative element is fixed to a surface of the interior portion to achieve the heating by operation of a heated fluid passing through the radiative element. Alternatively, an electrically resistive element is fixed to a surface of the interior portion to achieve the heating by operation of an electrical current passing through the electrically resistive element. As yet another alternative, a heating element is positioned externally to the gas desorption chamber so as to transmit radiation towards an exterior surface of the desorption chamber.

Additional aspects of the embodiment include:

A heat exchanger is positioned at the channel before the vacuum pump system and is operable to remove water condensate from the channel.

The outlet airlock and the inlet airlock are formed as a single airlock.

The desorption chamber is formed as an elongated channel with the outlet airlock disposed at a distal end of the elongated channel and the inlet airlock disposed at a proximal end of the elongated channel.

A water reservoir is provided externally to the central desorption chamber and is subjected to a heating element to create steam vapor from the water. The vapor is passed through a fluid line into the interior portion of the central desorption chamber to achieve the heating. A heat exchanger positioned above the vacuum pump system removes any condensate of the water vapor into a return line to the reservoir.

In operation, multiple gas adsorbent support structures are disposed within the desorption chamber, passing through the inlet airlock, into the interior portion of the desorption chamber. Subsequently, a desorption process occurs in the interior portion of the desorption chamber while heating and optionally under vacuum conditions. Finally, the spheres exit into the outlet airlock.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a gas desorption apparatus. In accordance with an embodiment of the invention, the gas desorption apparatus includes an inlet airlock leading into a desorption chamber. A toggleable door separates the inlet airlock from the desorption chamber and a vacuum pump system is connected to interior portions of each of the inlet airlock and the desorption chamber so as to establish near vacuum conditions in each of the interior portions. A heating element is adapted to heat the interior portion of the desorption chamber so as to cause desorption conditions within the interior portion of the desorption chamber. Finally, a channel couples the interior portion of the desorption chamber to an adsorbate chamber and is adapted to receive adsorbate during desorption and to channel adsorbate desorbed in the desorption chamber by action of a pump towards an adsorbate storage chamber.

Figure 1:
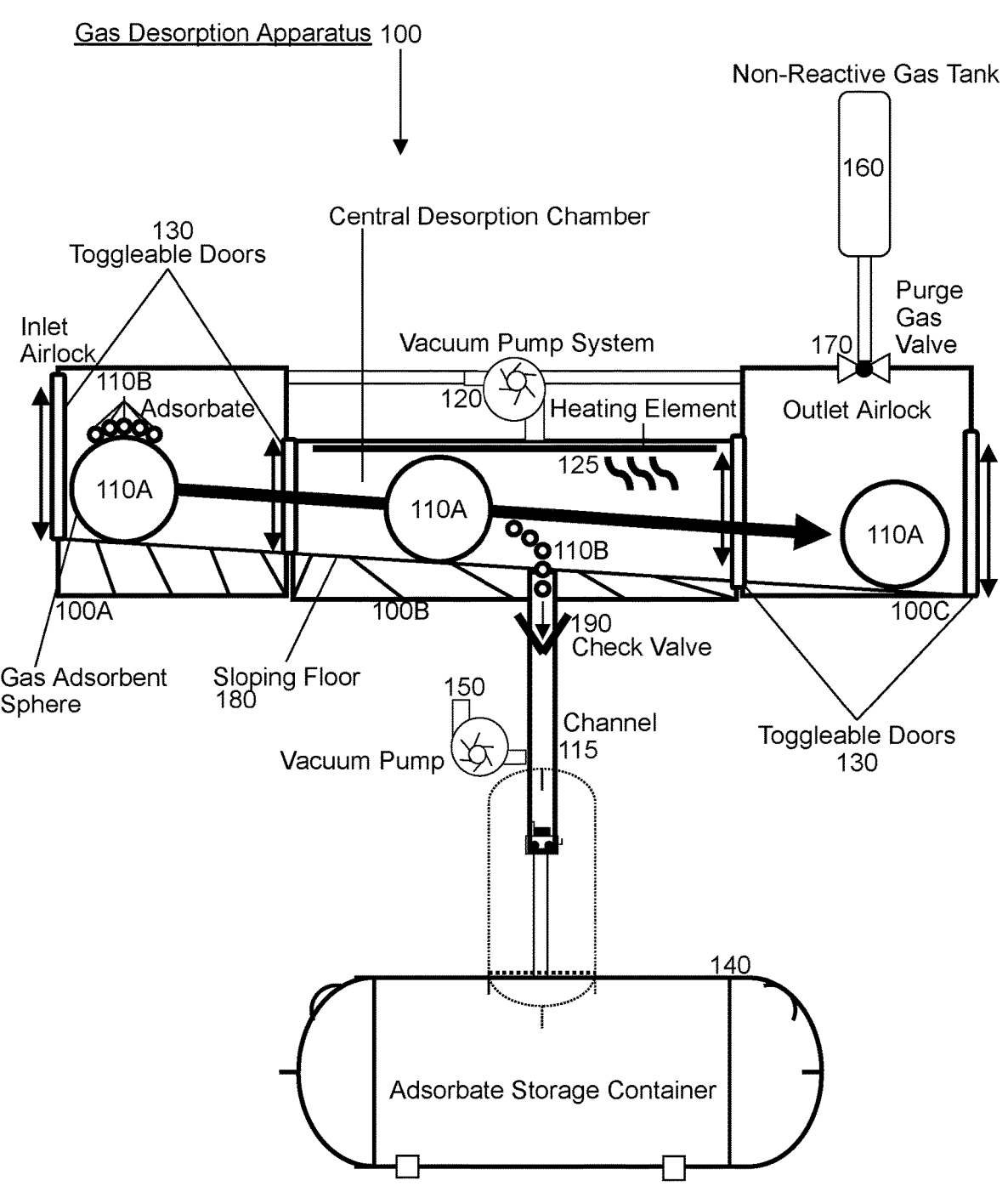
FIG. 1 is a schematic illustration of a gas desorption apparatus adapted to promote gas desorption of a gas adsorbate from multiple different gas adsorbent spheres present therein.

In further illustration, FIG. 1 schematically illustrates a gas desorption apparatus adapted to promote gas desorption of a gas adsorbate from multiple different gas adsorbent spheres present therein. As shown in FIG. 1, a gas desorption apparatus 100 includes each of an inlet airlock 100A and outlet airlock 100C and a central desorption chamber 100B. Optionally, the inlet airlock 100A and the outlet airlock 100C can be one in the same. A pump system 120 is couped to each of the inlet airlock 100A, the central desorption chamber 100B, and the outlet airlock 100C. The central desorption chamber 100B includes a heating element 125 adapted to heat an interior portion of the central desorption chamber 100B and in this regard can include by way of example, a radiant heater disposed within the interior portion of the desorption chamber 100B, an electrically resistive heater including wires fixed to the interior walls of the central desorption chamber 100B or an external heater directing heat towards an exterior surface of the central desorption chamber 100B.

Toggleable doors 130 provide access from the inlet airlock 100A to the central desorption chamber 100B, and from the central desorption chamber 100B to the outlet airlock 100C. Toggleable doors 130 additionally provide access for the exterior of the gas desorption apparatus 100 into the inlet airlock 100A, and from the outlet airlock 100C to the exterior of the gas desorption apparatus 100. A channel 115 coupled the interior portion of the gas desorption chamber 100B to an adsorbate storage container 140. A pump 150 is connected to the channel 115 inline between the central desorption chamber 100B and the adsorbate storage container 140 and a check valve 190 can be disposed between the pump 150 and the central desorption chamber 100B. The pump 150 pumps directly to the adsorbate storage container 140. However, it is to be recognized, in some aspects of the embodiment, the pump 150 can exhaust to air. Finally, a gas tank 160 is coupled to the outlet airlock 100C through purge gas valve 170 and stores non-reactive gas therein.

A gas adsorbent sphere 110A with gas adsorbate 110B adhered thereto is received through an ingress port of the inlet airlock 100A into the inlet airlock 100A and remains in the inlet airlock 100A as pressurization in each of the inlet airlock 100A and the central desorption chamber 100B approaches equivalency owing to the operation of the pump system 120, which may include a vacuum pump system or a purge pressurization system. An oxygen purge process commences within the inlet airlock 100A so as to remove impurities from the gas adsorbent sphere 100A and the surrounding atmosphere. Concurrently, the heating element 125 heats the central desorption chamber 100B. Thereafter, one of the toggleable doors 130 at an egress port of the inlet airlock 100A opens so as to permit the gas adsorbent sphere 110A to enter the central desorption chamber 100B.

Optionally, to promote movement of gas adsorbent sphere 110A from the inlet airlock 100A to the central desorption chamber 100B, the floor 180 of gas desorption apparatus 100 can be sloped as shown herein. As well, in one aspect of the embodiment, the gas desorption apparatus can be oriented vertically to permit the gravity motivation of movement of each gas adsorbent sphere 110A from the ingress port of the inlet airlock 100A to the egress port of the inlet airlock 100A.

Upon entering the central desorption chamber 100B, the one of the toggleable doors 130 at the egress port of the inlet airlock can close and gas desorption can commence with the adsorbate 110B flowing through the check valve 190 into the adsorbate storage container 140 by way of the channel 115 motivated by the vacuum conditions established in the channel 115 by the vacuum pump 150 placed in line with the channel 115. Of note, a heat exchanger (not shown) is positioned before the vacuum pump 150 so as to remove water condensate from the channel 115. Concurrently, pressure equivalency between the outlet airlock 100C and the central desorption chamber 100B are established and maintained in the outlet airlock 100C and once gas desorption is determined to have completed, another of the toggleable doors 130 of an ingress port to the outlet airlock 100C toggles open permitting movement of the gas adsorbent sphere 110A therein.

When the gas adsorbent sphere 110A is received in the outlet airlock 100C, the another of the toggleable doors 130 toggles closed and a cooling gas purge commences by activation of the purge gas valve 170 through the introduction of non-reactive gas from the non-reactive gas tank 160 into an interior portion of the outlet airlock 100C. Once sufficient cooling is determined, and pressure conditions within the outlet airlock 100C rise to a comparable pressure of the exterior of the gas desorption apparatus 100, an outer one of the toggleable doors 130 opens permitting passage of the gas adsorbent sphere 110A through an egress port of the outlet airlock 100C out to the exterior of the gas desorption apparatus.

As it will be understood, the foregoing process can be viewed as a batch process in which one or more groupings of the gas adsorbent spheres 110A move into and out of the central desorption chamber 100B. However, it is also to be understood that the foregoing process can be viewed as a continuous process with each individual one of the gas adsorbent spheres 110A moving through the central desorption chamber 100B continuously.

Figure 2:
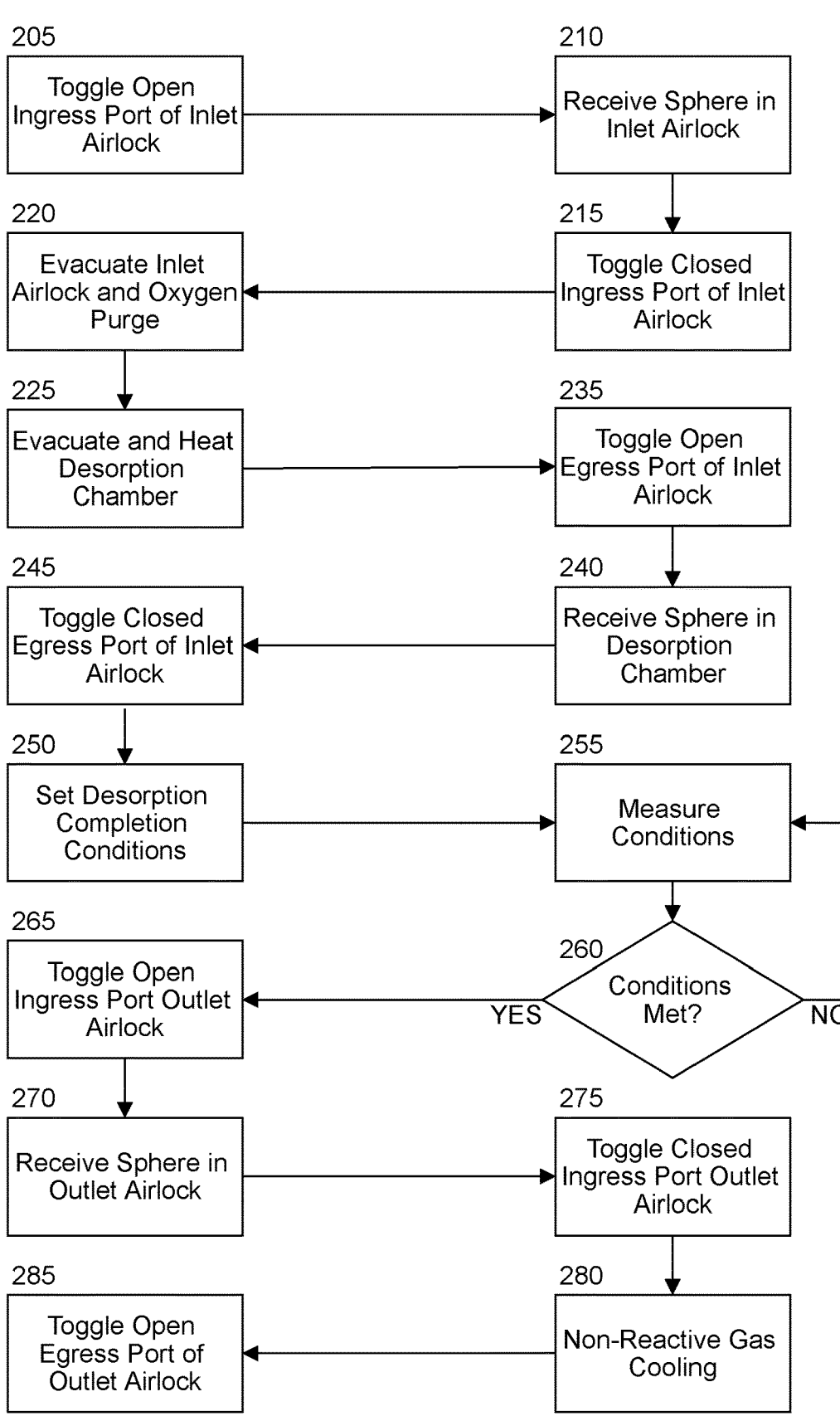
FIG. 2 is a flow chart illustration a process for promoting gas desorption of a gas adsorbate from multiple different gas adsorbent spheres passing through the apparatus of FIG. 1.

In even yet further illustration of the operation of the gas desorption apparatus, FIG. 2 is a flow chart illustration a process for promoting gas desorption of a gas adsorbate from multiple different gas adsorbent spheres passing through the apparatus of FIG. 1. Beginning in block 205, a toggleable door to an ingress port of the inlet airlock toggles open and in block 210, one or more gas adsorbent spheres are received in the inlet airlock 210. Thereafter, in block 215, the toggleable door to the ingress port of the inlet airlock toggles closed.

In block 220, the inlet airlock is evacuated by operation of one or more vacuum pumps in a vacuum pump system coupled to an interior portion of each of the inlet airlock and central desorption chamber. As well, in block 220, by operation of one or more of the vacuum pumps, an oxygen purge commences within the interior portion of the inlet airlock. Subsequently, in block 225, the pressure in the central desorption chamber is equalized with that of the inlet airlock utilizing the atmosphere within the interior portion of the central desorption chamber, by operation of the one or more vacuum pumps. As well, the heating element is activated in order to heat the interior portion of the central desorption chamber to a temperature determined to promote gas desorption.

In block 235, once the oxygen level within the inlet airlock is determined to fall below a threshold value and once the temperature within the central desorption chamber is determined to have risen above a threshold value, the toggeable door at the egress port of the inlet airlock toggles open in block 240, the sphere or spheres are received in the central desorption chamber. Thereafter, in block 245, the toggleable door at the egress port of the inlet airlock toggles closed and in block 250, vacuum conditions are established in the outlet airlock owing to the operation of one or more of the vacuum pumps and one or more desorption completion conditions are established such as a target pressure, target temperature, or target change in pressure.

As such, in block 255, conditions within the central desorption chamber are measured through respective sensors, including temperature and pressure. In decision block 260, it is determined whether or not the desorption completion conditions have been met based upon the measured conditions. If so, in block 265, the toggleable door at an ingress port of the outlet airlock toggles open and in block 270, the sphere or spheres are received from the central desorption chamber into the outlet airlock. Thereafter, in block 275 the toggleable door at the ingress port of the outlet airlock toggles closed.

Once the sphere or spheres are present within the outlet airlock, in block 280 a non-reactive gas is introduced into an interior portion of the outlet airlock so as to cool the sphere or spheres to below a target temperature. Once the cooling process has completed and the pressure within the interior portion of the outlet airlock reaches a pressure consistent with the pressure at an exterior of the gas desorption apparatus, in block 285, the toggleable door at an egress port of the outlet airlock toggles open to permit movement of the sphere or sphere out of the desorption apparatus.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A gas desorption apparatus comprising:

a central desorption chamber defining an interior portion adapted for heating;

an inlet airlock coupled to the central desorption chamber, the inlet airlock comprising:

an inlet airlock egress port allowing passage from an interior portion of the inlet airlock into the interior portion of the central desorption chamber;

an inlet airlock ingress port allowing passage from an exterior portion of the inlet airlock into the interior portion of the inlet airlock; and, an inlet airlock toggleable door at each of the ingress port and the egress port sealing the interior portion of the inlet airlock when each said toggleable door is in a closed position;

a pump system coupled to each of the interior portion of the desorption chamber and also the interior portion of the inlet airlock and operable to create pressure equivalency between the interior portion of the desorption chamber and the interior portion of the inlet airlock; and, a channel disposed between the interior portion of the desorption chamber and an adsorbate storage chamber through which adsorbate desorbed during gas desorption within the interior portion of the central desorption chamber travels into the adsorbate storage chamber, and an outlet airlock coupled to the central desorption chamber, the outlet airlock comprising:

an outlet airlock ingress port allowing passage from an interior portion of the outlet airlock from the interior portion of the central desorption chamber;

an outlet airlock egress port allowing passage to an exterior portion of the outlet airlock from the interior portion of the outlet airlock;

a vacuum line connected to the pump system;

an outlet airlock toggleable door at each of the egress port and the ingress port of the outlet airlock sealing the interior portion of the outlet airlock when each said toggleable door is in a closed position; and, a purge gas vent coupled to a room temperature and pressure non-reactive gas source.

2. The apparatus of claim 1, wherein the pump system comprises a vacuum pump for each of the inlet airlock and the central desorption chamber.

3. The apparatus of claim 2, wherein the vacuum pump for the central desorption chamber is positioned inline in the channel between the interior portion of the desorption chamber and the adsorbate storage chamber.

4. The apparatus of claim 2, further comprising a heat exchanger positioned inline in the channel before the vacuum pump.

5. The apparatus of claim 1, further comprising a radiative element fixed to a surface of the interior portion of the central desorption chamber in order to achieve the heating by operation of a heated fluid passing through the radiative element.

6. The apparatus of claim 1, further comprising an electrically resistive element fixed to a surface of the interior portion of the central desorption chamber to achieve the heating by operation of an electrical current passing through the electrically resistive element.

7. The apparatus of claim 1, further comprising a heating element external to the central desorption chamber transmitting radiation towards an exterior surface of the desorption chamber.

8. The apparatus of claim 1, wherein the outlet airlock and the inlet airlock are formed as a single airlock.

9. The apparatus of claim 1, wherein the desorption chamber is formed as an elongated channel with the outlet airlock disposed at a distal end of the elongated channel and the inlet airlock disposed at a proximal end of the elongated channel.

10. The apparatus of claim 1, wherein a multiplicity of spherical gas adsorbent particles are disposed within the desorption chamber, passing through the inlet airlock, into the interior portion of the desorption chamber and, subsequent to a desorption process occurring in the interior portion of the desorption chamber during vacuum conditions while heating, and exiting into the outlet airlock.

*  *  *  *  *